(12) United States Patent
Gawrisch et al.

(10) Patent No.: US 9,175,491 B2
(45) Date of Patent: Nov. 3, 2015

(54) WIND POWER INSTALLATION AND A TOWER OR TOWER SEGMENT AND A DOOR FRAME FOR IT

(71) Applicant: REpower System AG, Hamburg (DE)

(72) Inventors: Rüdiger Gawrisch, Schacht-Audorf (DE); Roberto Klugmann, Flintbek (DE)

(73) Assignee: Senvion SE, Hamburg (DE)

( * ) Notice: Subject to any disclaimer, the term of this patent is extended or adjusted under 35 U.S.C. 154(b) by 0 days.

(21) Appl. No.: 14/191,836

(22) Filed: Feb. 27, 2014

(65) Prior Publication Data

US 2014/0237937 A1 Aug. 28, 2014

Related U.S. Application Data

(63) Continuation of application No. 12/735,554, filed as application No. PCT/DE2009/000099 on Jan. 28, 2009.

(30) Foreign Application Priority Data

| Jan. 30, 2008 | (DE) | 10 2008 006766 |
| Mar. 5, 2008 | (DE) | 10 2008 012664 |
| Aug. 14, 2008 | (DE) | 10 2008 037768 |

(51) Int. Cl.
*E04H 12/00* (2006.01)
*F03D 11/00* (2006.01)
*F03D 11/04* (2006.01)

(52) U.S. Cl.
CPC .............. *E04H 12/003* (2013.01); *F03D 11/00* (2013.01); *F03D 11/04* (2013.01); *F05B 2260/64* (2013.01); *Y02E 10/722* (2013.01)

(58) Field of Classification Search
CPC ..... E04H 12/003; E04H 12/085; F03D 11/00; F03D 11/04; F03D 1/001; F03D 1/003; F05B 2260/64; Y02E 10/722
USPC .................. 52/40, 651.01, 834, 835, 651.02, 52/651.07; 290/44, 55
See application file for complete search history.

(56) References Cited

U.S. PATENT DOCUMENTS

| 2,506,978 | A | * | 5/1950 | Unterberger | 160/40 |
| 3,159,093 | A | * | 12/1964 | Rosenfeld | 49/401 |
| 3,698,308 | A | * | 10/1972 | Navara | 454/213 |
| 3,768,016 | A | * | 10/1973 | Townsend et al. | 455/25 |
| 4,915,590 | A | * | 4/1990 | Eckland et al. | 416/225 |
| 6,357,549 | B1 | * | 3/2002 | Brennan et al. | 182/133 |
| 6,408,575 | B1 | * | 6/2002 | Yoshida et al. | 52/40 |
| 6,470,645 | B1 | * | 10/2002 | Maliszewski et al. | 52/745.18 |
| 6,532,700 | B1 | * | 3/2003 | Maliszewski et al. | 52/40 |
| 6,672,021 | B2 | * | 1/2004 | Kusano et al. | 52/211 |
| 6,676,122 | B1 | * | 1/2004 | Wobben | 290/55 |
| 7,238,105 | B2 | * | 7/2007 | Reinders | 454/223 |

(Continued)

*Primary Examiner* — James Ference
(74) *Attorney, Agent, or Firm* — Nash and Titus, LLC

(57) ABSTRACT

A tower or a tower segment of a wind turbine, having a door for entering the inside of the tower, comprising a door frame, which has a door opening that is preferably closed by a door leaf, and a door frame for a door of a tower of a wind turbine, the frame having a door opening that is preferably closed by a door leaf, and a wind turbine having a tower, a door provided for entering the inside of the tower, and a staircase leading to the door on the outside of the tower, and an air passage opening in at least one advantageous location. The door frame has at least one air passage opening, particularly an air inlet opening.

8 Claims, 9 Drawing Sheets

(56) References Cited

U.S. PATENT DOCUMENTS

| | | | |
|---|---|---|---|
| 7,270,600 B2* | 9/2007 | Kim et al. | 454/198 |
| 7,407,342 B2* | 8/2008 | Seidel | 405/224.1 |
| 7,436,084 B2* | 10/2008 | Wobben | 290/55 |
| 7,448,169 B2* | 11/2008 | Maliszewski et al. | 52/79.1 |
| 7,484,933 B2* | 2/2009 | Wobben | 416/1 |
| 7,830,030 B2* | 11/2010 | Altemark | 290/44 |
| 8,146,320 B2* | 4/2012 | Seidel et al. | 52/651.01 |
| 8,171,674 B2* | 5/2012 | Bagepalli et al. | 52/40 |
| 8,227,932 B2* | 7/2012 | Murata et al. | 290/55 |
| 2003/0147753 A1* | 8/2003 | Ollgaard | 416/244 A |
| 2004/0172881 A1* | 9/2004 | Minami | 49/193 |
| 2006/0086058 A1* | 4/2006 | Reinders | 52/204.1 |
| 2006/0090433 A1* | 5/2006 | Stahl et al. | 55/497 |
| 2006/0220289 A1* | 10/2006 | Okumura et al. | 267/140.13 |
| 2006/0220386 A1* | 10/2006 | Wobben | 290/44 |
| 2006/0222465 A1* | 10/2006 | Seidel | 405/224 |
| 2006/0225379 A1* | 10/2006 | Seidel et al. | 52/726.3 |
| 2006/0228218 A1* | 10/2006 | Cone | 416/244 A |
| 2006/0236648 A1* | 10/2006 | Grundman et al. | 52/726.4 |
| 2007/0006541 A1* | 1/2007 | Seidel | 52/292 |
| 2007/0046406 A1* | 3/2007 | Matsuoka et al. | 335/202 |
| 2007/0056801 A1* | 3/2007 | Iversen | 182/141 |
| 2007/0095008 A1* | 5/2007 | Arsene | 52/745.04 |
| 2007/0125037 A1* | 6/2007 | Meiners | 52/720.1 |
| 2007/0145752 A1* | 6/2007 | Wobben | 290/55 |
| 2007/0148004 A1* | 6/2007 | Wernicke et al. | 416/244 R |
| 2007/0152449 A1* | 7/2007 | Wobben | 290/44 |
| 2007/0187956 A1* | 8/2007 | Wobben | 290/55 |
| 2007/0289231 A1* | 12/2007 | Nevins | 52/204.5 |
| 2007/0289250 A1* | 12/2007 | Maliszewski et al. | 52/745.04 |
| 2007/0290426 A1* | 12/2007 | Trede et al. | 269/1 |
| 2007/0296220 A1* | 12/2007 | Kristensen | 290/55 |
| 2008/0034675 A1* | 2/2008 | Kristensen | 52/40 |
| 2008/0081041 A1* | 4/2008 | Nemeth | 424/145.1 |
| 2009/0045628 A1* | 2/2009 | Erdman et al. | 290/44 |
| 2009/0278359 A1* | 11/2009 | Trede | 290/55 |
| 2010/0308596 A1* | 12/2010 | Gawrisch et al. | 290/55 |
| 2010/0313497 A1* | 12/2010 | Jensen | 52/173.1 |
| 2011/0037270 A1* | 2/2011 | Uphues et al. | 290/55 |
| 2011/0044817 A1* | 2/2011 | Bendel et al. | 416/204 R |

* cited by examiner

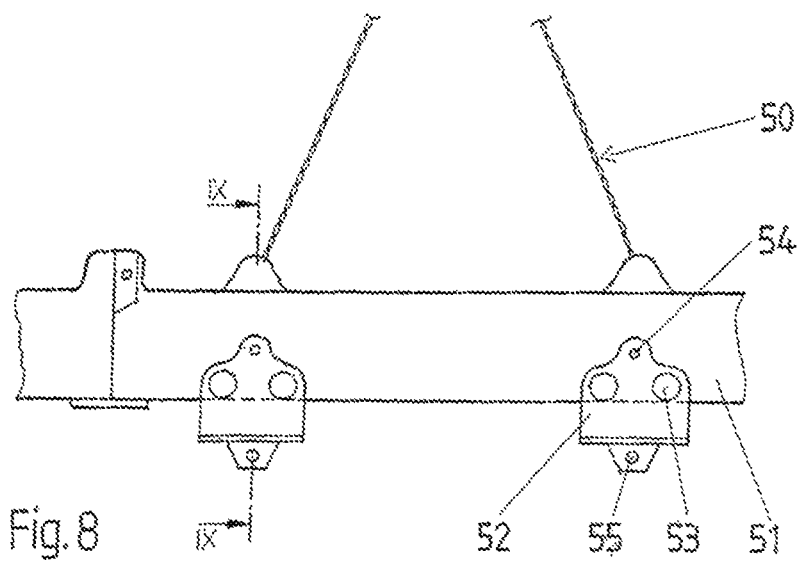
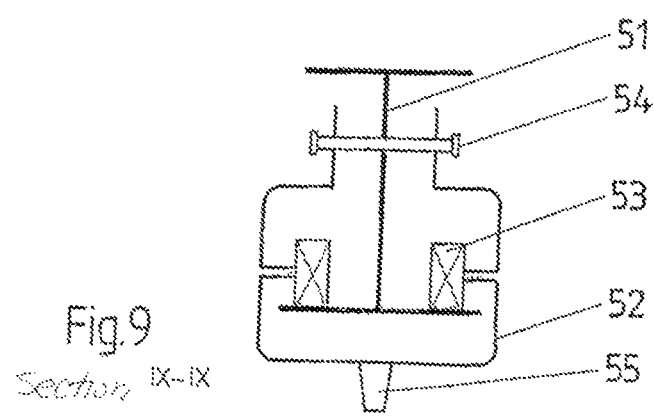

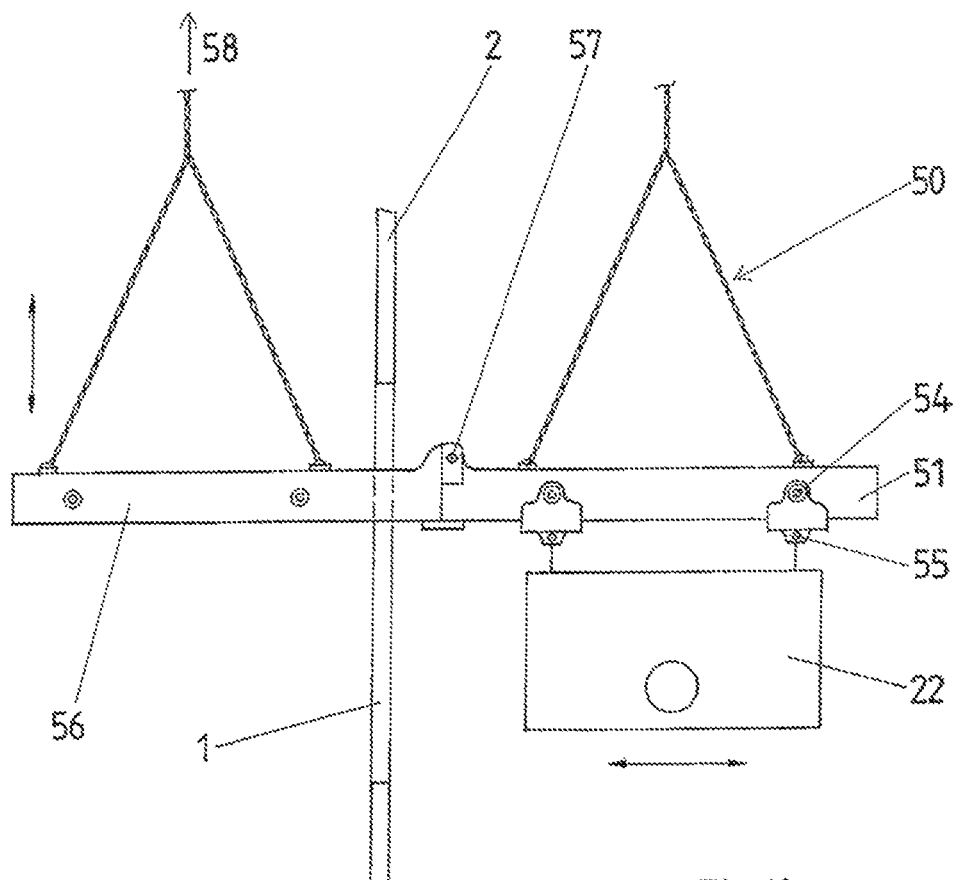

WIND POWER INSTALLATION AND A TOWER OR TOWER SEGMENT AND A DOOR FRAME FOR IT

BACKGROUND OF THE INVENTION

This application is a national phase application based on PCT/DE2009/000099, filed Jan. 28, 2009, and claims priority therefrom; and further claims priority from German applications DE 10 2008 006 776.0 (filed Jan. 30, 2008), DE 10 2008 012 664.0 (filed Mar. 5, 2008), and DE 10 2008 037 768.6 (filed Aug. 14, 2008, and the contents of all the afore-mentioned applications are incorporated herein by reference in their entirety.

The invention relates to a tower or a tower segment of a wind power installation with a door for entering the interior of the tower, comprising a door frame comprising a door opening preferably to be closed with a door leaf.

Furthermore, the invention relates to a door frame for a door of a tower of a wind power installation that comprises a door opening to be closed preferably with a door leaf and relates to a wind power installation with a tower with a door provided for entering the interior of the tower and with stairs on the outside of the tower leading to the door, which tower is preferably a tower like the one initially cited.

Current wind power installations usually have a closed tower that is frequently built up from prefabricated tower segments, which tower can be entered through a door and in which an ascent is possible up to a so-called car on the tower head, possibly with an elevator. Electrical and/or electrotechnical apparatuses, for example, a converter and/or a transformer, are housed in this tower which heat up significantly in some cases and must therefore be tempered, especially cooled in order to avoid damage. To this end basically closed cooling circuits, especially with water cooling are considered; however they have the danger of leakages and are maintenance-intensive. A simpler air cooling of the tower interior or of selected areas of it, preferably with filtered air is therefore more to be recommended. For this, air must be able to enter into the tower at at least one suitable position and can exit again at this position or at another position in the same amount.

SUMMARY OF THE INVENTION

The invention therefore has the basic problem of providing an air passage opening at at least one favorable position.

The invention solves this problem in that the door frame has at least one air passage opening, in particular an air entrance opening.

This solution has, among other things, the advantages that the air passage opening can be readily constructed with manufacturing technology, that the statics of the tower are not adversely affected as a result, and that it is arranged in an area in which usually an apparatus to be tempered is located in spatially close proximity in the tower. The air can therefore by made available and supplied in a simple and economical manner to the apparatus to be tempered, preferably, for example, supplied with relatively short pipes or hoses.

The air passage opening is made available in an especially favorable manner in accordance with the invention if it is arranged under the door opening, as is provided in a further development of the invention.

BRIEF DESCRIPTION OF THE FIGURES

FIG. 5a shows a fourth exemplary embodiment in accordance with the invention of a tower ventilation in a schematic perspective view of a tower foot, FIG. 8 shows a lateral view of a lifting device, FIG. 9 shows a sectional view along line IX-IX in FIG. 8, FIG. 10 shows a loading bridge for bringing a structural component out of the tower segment.

DESCRIPTION OF THE INVENTION

Figure 1:
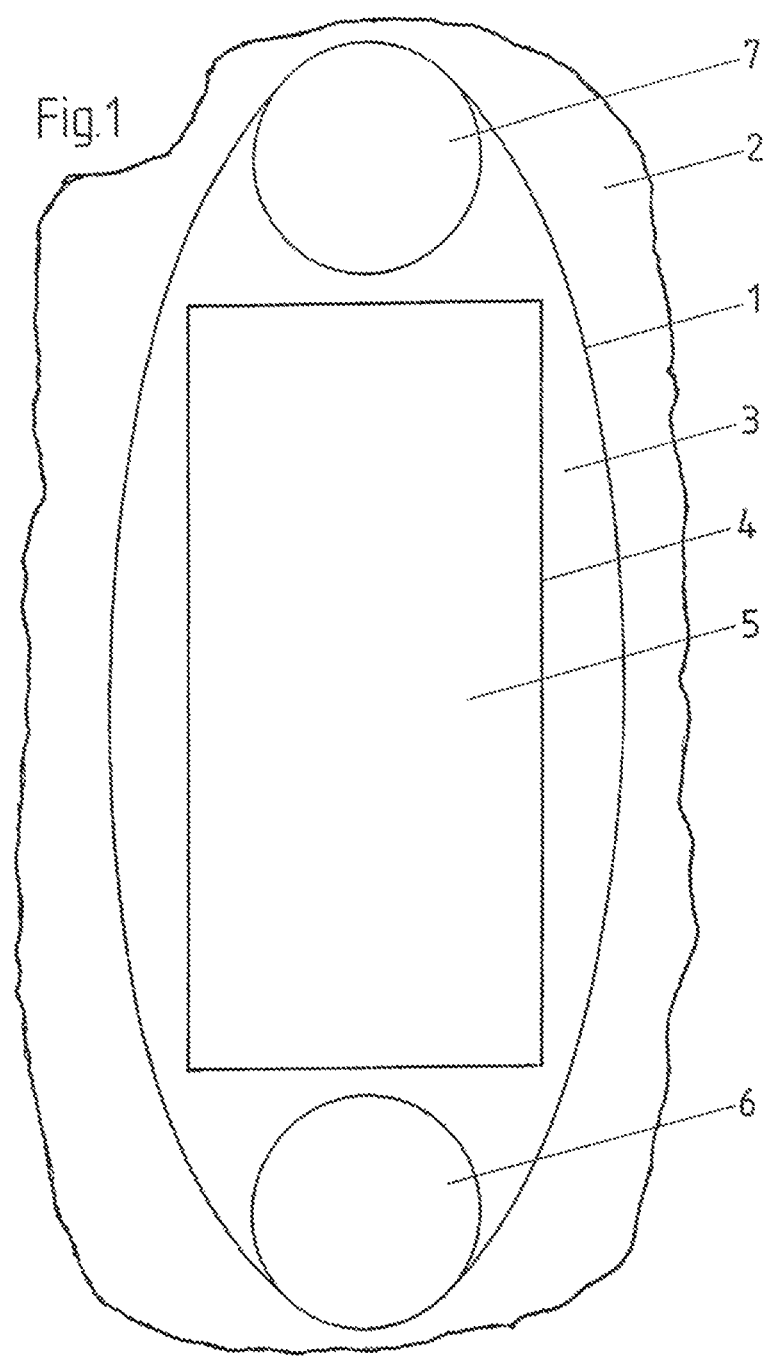
FIG. 1 shows a view of a door frame in accordance with the invention with air passage openings.

The door frame preferably has an outer contour that is substantially oval in order not to adversely affect the statics of the tower with this especially stable shape in spite of this passage in the door wall. If the door opening, as is provided in another further development of the invention, is designed substantially approximately rectangular and perhaps the oval outer form is dimensioned somewhat more generously, there is sufficient space for an air passage opening in accordance with the invention inside the door frame in particular above and below the door opening.

The air passage opening is preferably provided with protection against the weather, for example, with lamellas that screen against rain.

According to a preferred further development of the invention at least one air exit opening is provided in the door wall, preferably on the side of the tower facing away from the air entrance opening and preferably somewhat higher than the latter, and in particular the air exit opening can also be provided with weather protection.

A next element of the invention provides that at least one suction apparatus is provided for the exiting of air. This can be in essence a ventilator, preferably in a ventilation conduit.

It is advantageously provided for a tower with a door provided for entering the tower interior and with stairs on the outside of the tower leading to the door in accordance with another further development of the invention for which independent protection is also claimed, that at least one apparatus for filtering air is arranged under the stairs. A filter installation is purposeful for filtering the air entering into the tower interior and the housing, in accordance with the invention, of a filter apparatus offers protection to the filter apparatus and at the same time makes it easily accessible.

In particular, the filter apparatus placed in accordance with the invention can be especially advantageously connected in front of an air passage opening arranged under the door opening. For example, the air path formed by the filter apparatus and the air passage opening can be associated with at least one electrical device, preferably a converter and/or a transformer for tempering, in particular cooling.

Another further development of the invention provides that in order to temper an apparatus to be tempered and preferably arranged above the door level in the tower interior the door frame has at least one air passage opening above the door opening. Then, for example, the air passage opening arranged above the door opening could be followed by at least one filter apparatus in the interior of the tower. However, the filter apparatus can also be arranged outside of the tower and in front of the air passage opening.

A filter housing for handling, especially for receiving a particle load, in particular a load of sand and dust, is preferably provided for the (particular) filter apparatus. In particular, the filter housing can then have a bottom particle removal with which the filter apparatus can be easily cleaned and the load removed from it. The filter apparatus preferably comprises at least one replaceable filter cassette which could contain, e.g., at least one zigzag filter.

Independent protection is also claimed for a door frame for a door of a tower of a wind power installation that comprises a door opening that is closed with a door leaf and that is distinguished by at least one air passage opening in an independent solution of the problem posed. The resulting advantages have already been described in connection with the tower in accordance with the invention.

The air passage opening is preferably arranged in accordance with the invention underneath the door opening for the reasons already mentioned above. In particular, the door frame can have a substantially approximately oval outer contour for static reasons and the door opening can be substantially approximately rectangular, so that there is sufficient space present between the contour of the door opening and the oval outer contour, especially above and below the door opening, for air passage openings in accordance with the invention.

The air passage opening can be provided with weather protection comprising, e.g., lamellas.

Independent protection is also claimed for a wind power installation with a tower with a door provided for entering the interior of the tower and preferably with stairs on the outside of the tower which stairs lead to the door, which wind power installation is characterized according to the invention in that at least one apparatus for the filtering of air is arranged under the stairs. Even the advantages resulting from this have already been described above.

In particular, as already mentioned, the filter apparatus can be connected in front of a air passage opening arranged under the door opening and the air path formed by the filter apparatus and the air passage opening could be associated with at least one electrical apparatus, preferably a converter and/or a transformer, for tempering, in particular cooling.

For the tempering of an apparatus to be tempered and to be arranged preferably above the door level in the tower interior, the door frame could comprise at least one air passage opening above the door opening. For example, a converter could be arranged above a transformer in the tower interior. However, for example, a converter and a transformer could also be housed in the bottom part of the tower, or a converter could be housed in the bottom part of the tower and a transformer could be arranged in a separate small transformer housing outside of the tower. Depending on the housings and arrangements, the door area of the tower could be provided in accordance with the invention in a simple, economical and efficient manner with at least one suitable air passage opening.

An air passage opening arranged above the door opening could be followed by at least one filter apparatus inside the tower. The filter apparatus can alternatively be arranged outside the tower and connected in front of the air passage opening.

A (particular) filter apparatus is preferably equipped with a filter housing for handling, in particular receiving a particle load, especially a sand and dust load.

In particular, the filter housing can comprise a bottom particle removal via which the filter housing can be relieved of its load and cleaned in a simple and comfortable manner. The filter apparatus preferably comprises at least one replaceable filter cassette.

Exemplary embodiments from which even further inventive features can result but to which the invention is not limited in its scope are shown in the drawings.

FIG. 1 shows the area 1 of a door in a section of a wall of a tower 2 of a wind power installation. Area 1 of the door and of the door frame 3 has a substantially oval contour in the exemplary embodiment shown for static reasons. A door opening 4 framed by door frame 3 and closed by a door leaf 5 has a rectangular form in this exemplary embodiment. As a result and in accordance with the invention sufficient space for air passage openings 6, 7 is present in particular above and below door opening 4 in door frame 3 in order to ventilate the tower, in particular to cool apparatuses housed in it with air. The air passage openings 6, 7 could, e.g., be designed circularly, as in the selected exemplary embodiment and have a diameter of, for example, approximately 450 mm. A rectangularly constructed door opening 4 advantageously makes it possible to use a standard door.

Figure 2:
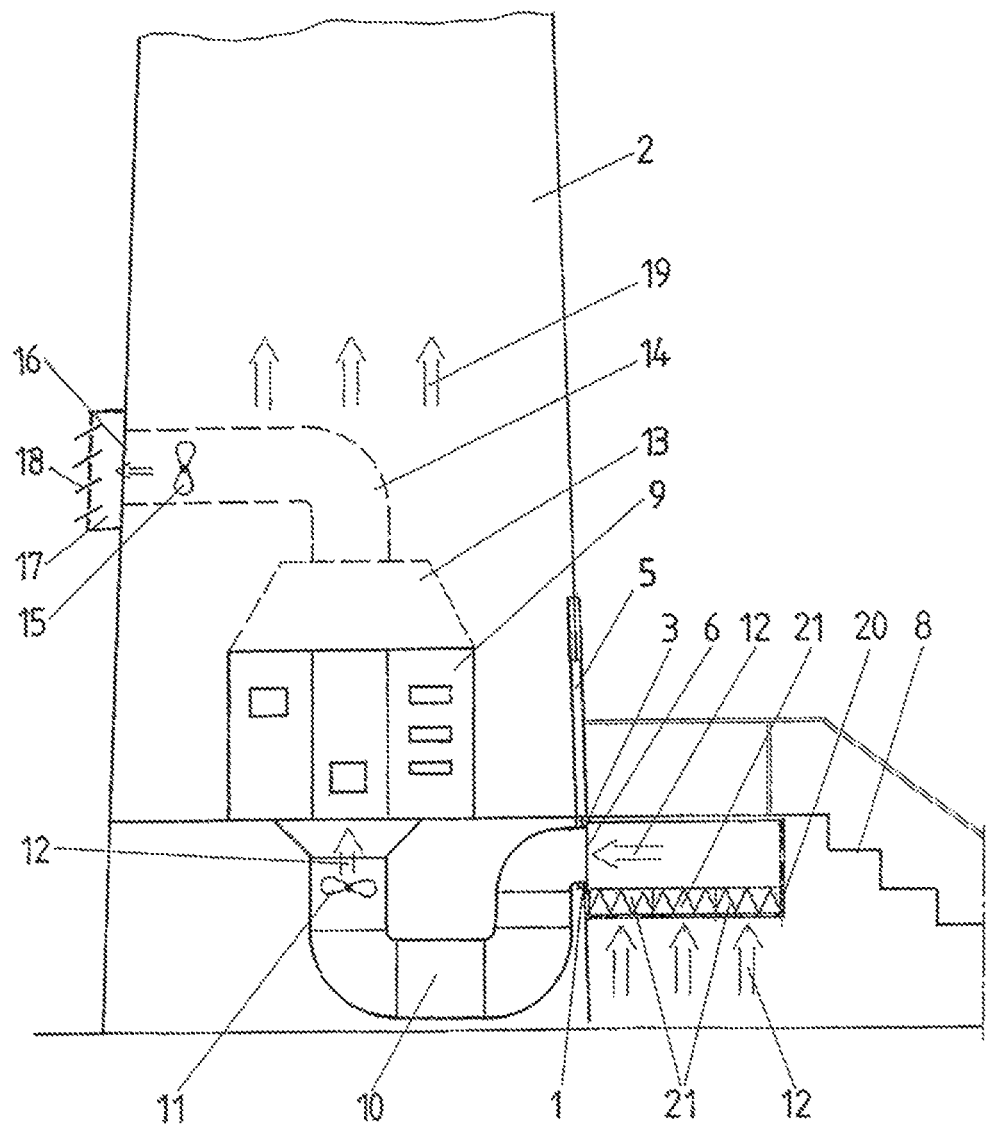
FIG. 2 shows a first exemplary embodiment in accordance with the invention of a tower ventilation in schematic section through a tower foot.

FIG. 2 shows a schematic section through the foot of a tower 2 of a wind power installation. Tower 2 comprises a door with a door leaf 5 according to FIG. 1. Inside of outer contour 1 of a door frame 3 an air passage opening 6 is located in door frame 3 underneath door leaf 5. This passage opening 6 is additionally located underneath and in the protection of stairs 8 leading to the door of tower 2. An electrical apparatus 9 that is to be tempered, especially cooled, is located inside tower 2 in the area of its foot, for which a sufficient air flowthrough and air exchange is ensured in the case of an air cooling in accordance with the invention. To this end in this exemplary embodiment air passage opening 6 is connected in such a manner that it conducts air via an air conduit 10, for example, a hose to electrical apparatus 9. In addition, a ventilator 11 is preferably inserted in air conduit 10 that draws the air in the direction of arrows 12 in through the air discharge opening 6 and supplies it to electrical apparatus 9. The air can optionally be trapped after electrical apparatus 9 by a hood 13 and discharged to the outside via a further air conduit 14 and with another ventilator 15 through an air discharge opening 16. Air discharge opening 16 is preferably arranged on the side of tower 2 facing away from air passage opening 5. Also, by way of example a weather protection 17 with lamellas 18 is indicated in the drawing at air discharge opening 16. Alternatively, however, for a drawing off of air in the direction of arrows 19 simply the chimney effect of tower 2 itself could be used, which, however, might not be pronounced enough. Theoretically, an air exchange, that is, an entering and an exiting of air could take place through the air passage opening alone; however, such an air exchange, especially at a high ambient temperature, might possibly not be pronounced and reliable enough. A solution like the one in FIG. 2 is therefore preferred. In the case of low ambient temperatures a ventilator could perhaps be eliminated for cost reasons.

Electrical apparatus 9 can be, for example, a converter. However, for example, a transformer could also be set up at this location whereas a converter could be located on the tower head in the car of the wind power installation. A transformer could also be set up, for example, outside of tower 2 and cooled, for example, in its own small transformer housing.

In addition, a filter apparatus 20 is recognizable in FIG. 2. This filter apparatus 20 is arranged underneath stairs 8 in a protected and at the same time readily accessible area. It can consist, for example, of three filter cassettes 21 placed next to each other like plates that can be readily removed, replaced and cleaned. For example, a filter material folded in a zigzag-shape can be inserted in each filter cassette 21. The arrangement of filter apparatus 20 with a suction intake opening facing downward to the ground has the advantage that particles trapped in filter apparatus 20 fall downward out of filter apparatus 20 at least partially automatically by gravity and optional vibration. Filter apparatus 20 is therefore self-cleaning.

Figure 3:
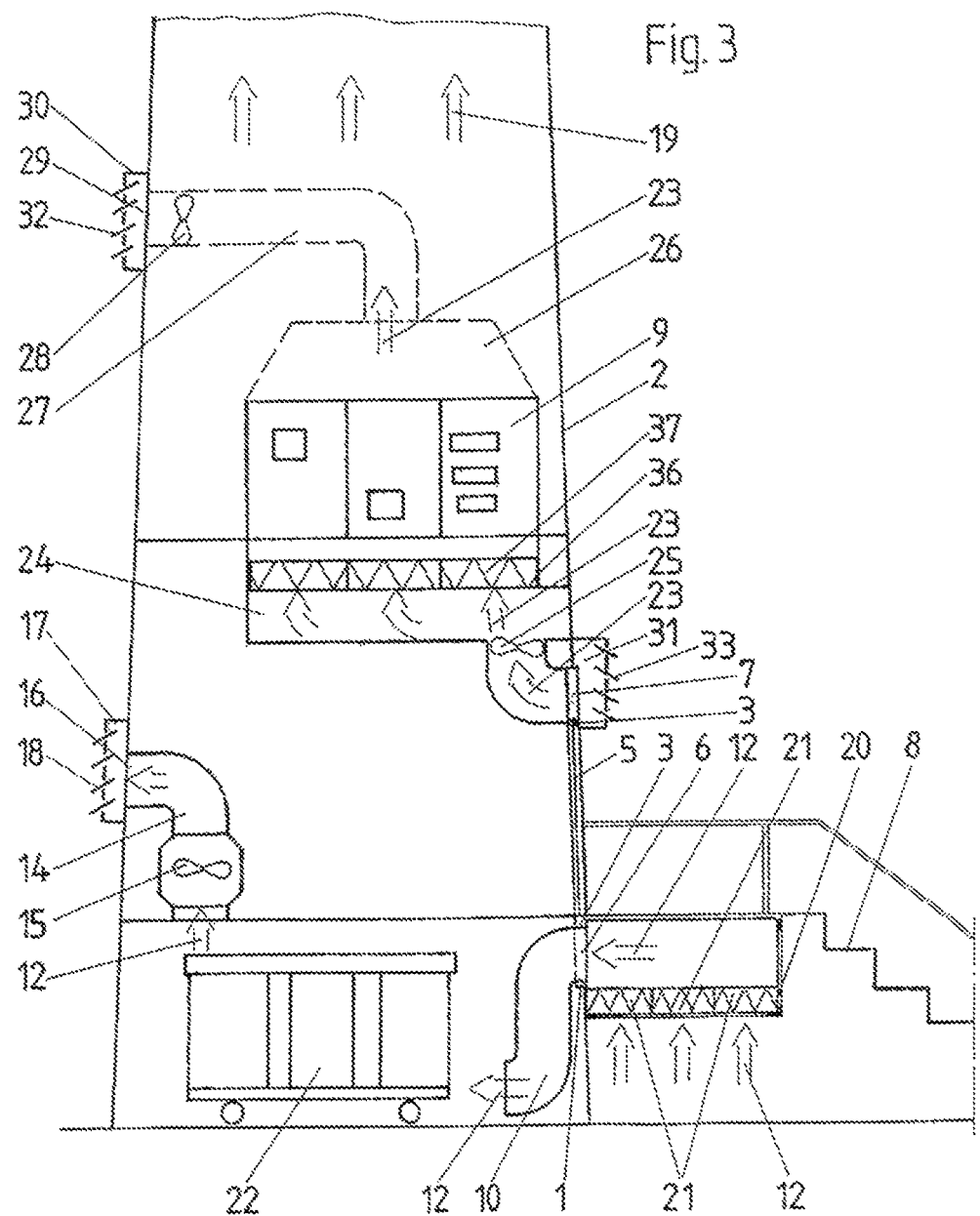
FIG. 3 shows a second exemplary embodiment in accordance with the invention of a tower ventilation in schematic section through a tower foot.

FIG. 3 shows a second exemplary embodiment of a ventilated tower foot. The same structural elements are designated with the same reference numerals as in FIG. 2.

In distinction to the exemplary embodiment according to FIG. 2, now the electrical apparatus 9, for example, a converter, is arranged further up in the tower 2 whereas a further electrical apparatus 22, for example, a transformer, is arranged all the way at the bottom in tower 2. Therefore, now the electrical apparatus 22 is cooled by an air flow 12 that flows from the air passage opening 6 arranged under the door leaf 5 to the air discharge opening 16. The air flow is preferably transported here by a ventilator 15 that, deviating from the position shown in FIG. 3, can be arranged directly on the transformer or the electrical apparatus 22. Such an arrangement facilitates the assembly.

Apparatus 9, which is arranged higher, is cooled by another air flow 23. To this end another air passage opening 7 is arranged above door leaf 5 in door frame 3. From this upper air passage opening 7 a ventilation conduit 24 with a ventilator 25 runs to electrical apparatus 9. A hood 26 with a ventilation conduit 27 with a ventilator 28 that runs to another air discharge opening 29 is optionally located above this apparatus 9. Even air discharge opening 29 and upper air passage opening 7 have a weather protection 30, 31 with lamellas 32, 33. Even in this described air path a filter apparatus 36 with filter cassettes 37 can be introduced in front of electrical apparatus 9, which filter is located inside tower 2.

Figure 4:
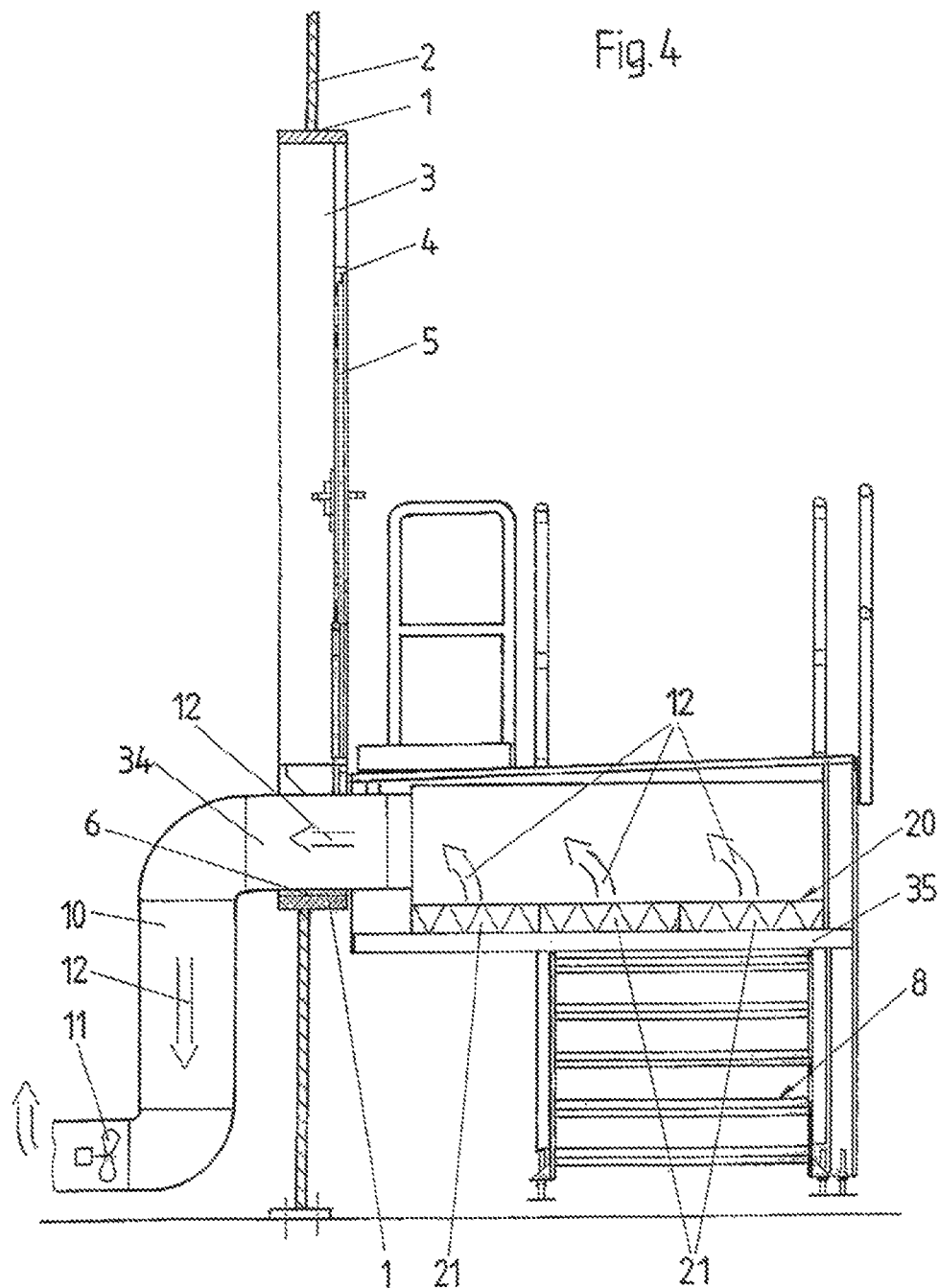
FIG. 4 shows a detailed section from FIG. 2 in a stairs area of the tower foot.

FIG. 4 shows a detailed section from FIG. 2 in a stairs area of the tower foot, but with somewhat differently shaped stairs 8. The same structural elements are again designated with the same reference numerals as in the preceding figures.

In this FIG. 4 in particular the formation of the door in section and the formation and arrangement of the filter cassettes 21 can once again be recognized more precisely.

Here, an air conduction piece 34 is introduced into air passage opening 6.

A catch pan for dust and similar particles that can be removed or folded up could be provided, for example, in the area 35 underneath filter cassettes 21. A folding mechanism carries the weight of filter cassettes 21 and the catch pan during the folding up. An uncontrolled downward falling of filter cassettes 21 and the catch pan can be prevented by the folding mechanism.

Figure 5:
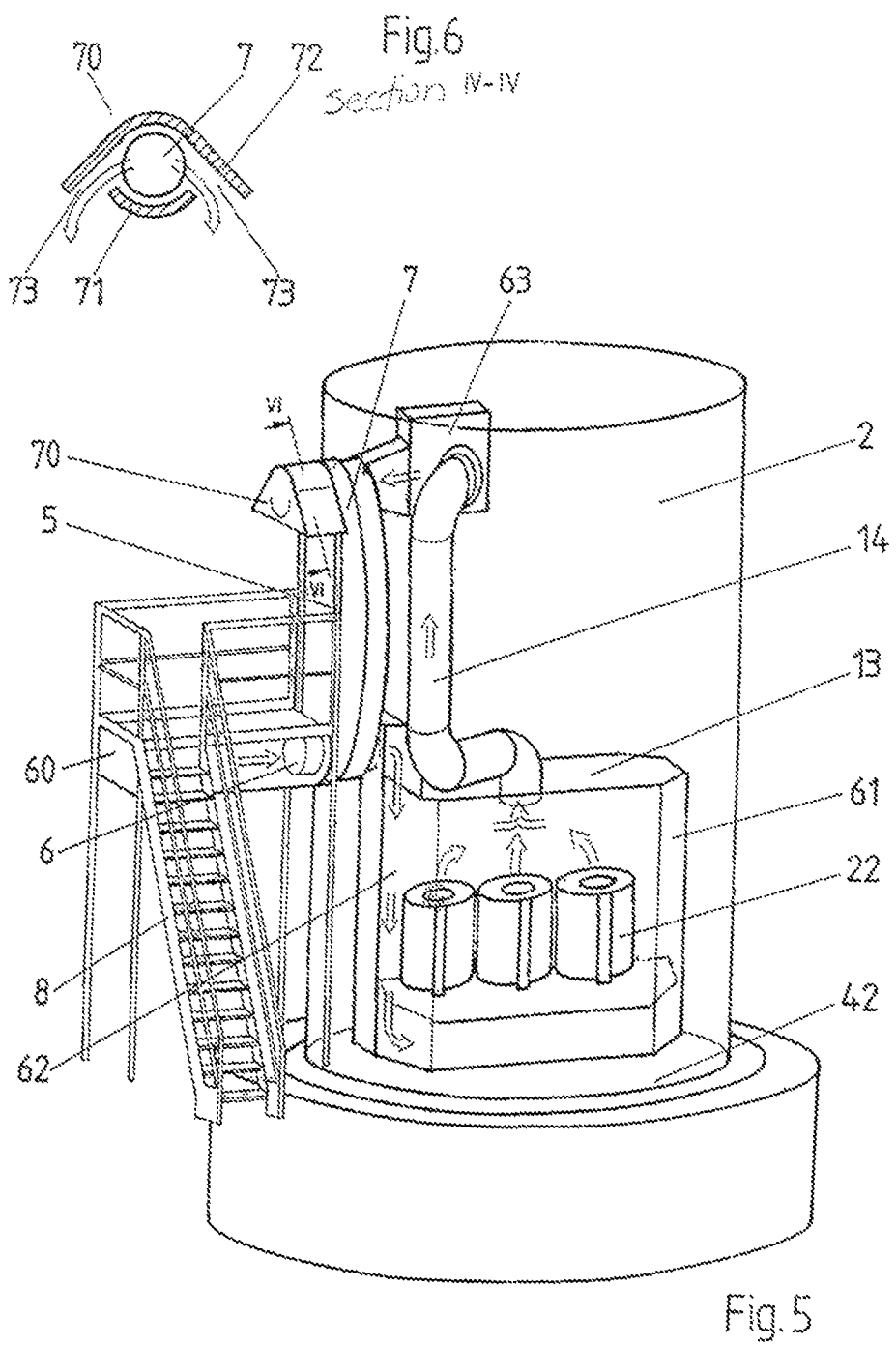
FIG. 5 shows a third exemplary embodiment in accordance with the invention of a tower ventilation in a schematic perspective view of a tower foot.

FIG. 5 shows tower 2 with transparent outer walls. Even in this embodiment of the invention there is sufficient space in door frame 3 for air passage openings 6, 7 in order to ventilate the inner space of tower 2. The tower ventilation in accordance with the invention serves to cool the electrical apparatuses 9 provided in the foot of tower 2 such as, for example, transformer 22. Air passage opening 6 located underneath door frame 5 is arranged underneath the landing of stairs 8. A filter block 60 is mounted on the bottom of the landing in the direction of the air flow, that is characterized by arrows, in front of passage opening 6 on the outside of tower 2. Filter box 60 cleans cooler air drawn in from the outside before passing through passage opening 6 from suspended particles, dust and the like.

Transformer 22 is housed in an air-conducting transformer housing 61 and is arranged somewhat above the bottom of the foot of tower 2. The air drawn in through passage opening 6 can be conducted through an air conduit 62 of air-conduction transformer housing 61 underneath transformer 22. From there it flows into the inner area of transformer housing 61 past transformer 22 and receives its heat at least in part. The air heated by the reception of heat rises in an accelerated manner up in transformer housing 61. In the upper area of transformer housing 61 the heated air is trapped by a hood 13 and conducted through the further air conduit 14 to a ventilator 63 located inside the tower adjacent to passage opening 7. Ventilator 63 blows the heated air out of air passage opening 7 located above door leaf 5 out of the inner area of tower 2 again into the ambient air. Ventilator 63 can, deviating from the view in FIG. 5, be arranged even directly on an upper side of hood 13 in order to simplify its assembly.

Figure 6:
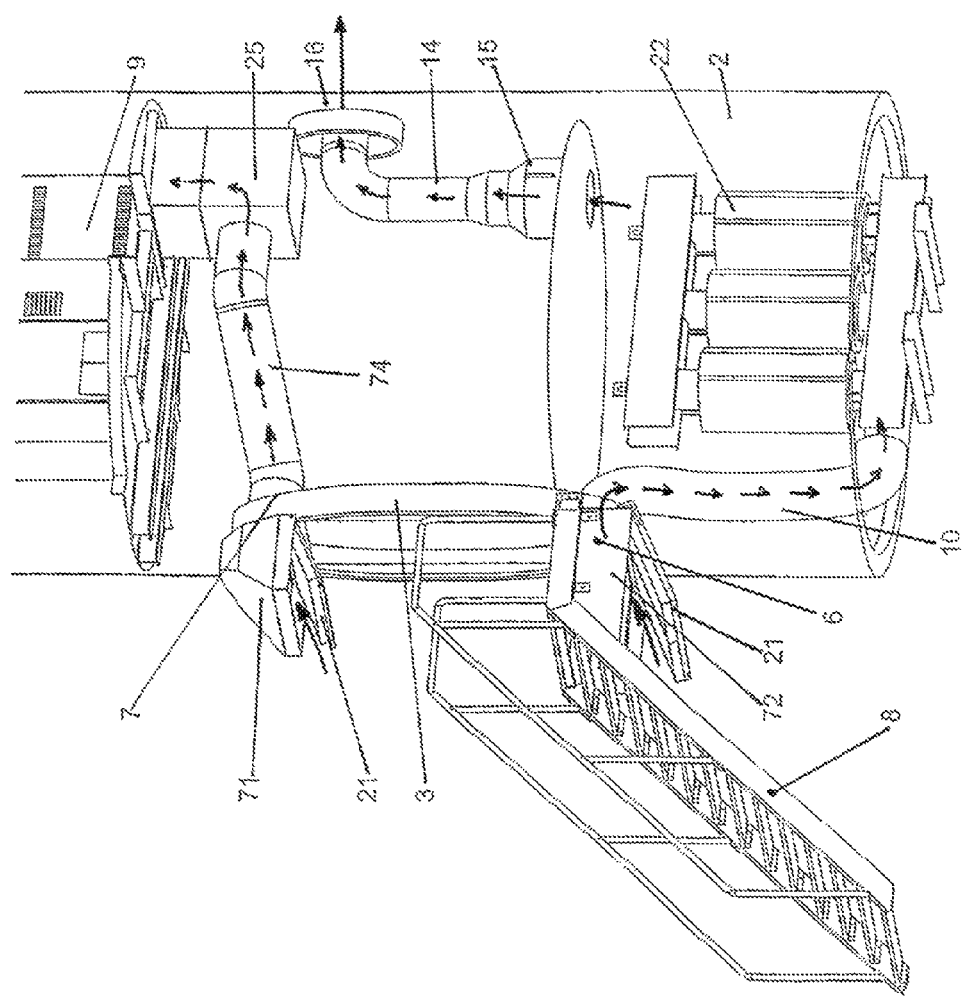
FIG. 6 shows a sectional view of an exhaust box along line VI-VI in FIG. 5.

An exhaust box 70 according to FIG. 6 is provided outside on air passage opening 7. Exhaust box 70 is closed on its outwardly facing front side and is limited on the bottom and remote from the bottom by two bent strips 71, 72 with different lengths, between which two air passage slots 73 running parallel to the bottom remain free. Air passage slots 73 are covered by the longer strip 72 remote from the bottom and thus protected from rain falling in. An air baffle sheet for dividing the flow onto the two air passage slots 73 can also be advantageously provided in the inside of exhaust box 70.

In FIG. 5a the two air passage openings 6, 7 are covered on the one hand by door frame 3 and on the other hand by the two filter boxes 71, 72 arranged outside of the tower. Upper filter box 71 is connected in front of upper air passage opening 7 in the direction of flow of the entering air. Upper filter box 71 can be opened downward toward the ground. Filter cassettes 21 are let into filter boxes 71, 72. Filter cassettes 21 are provided above a cover that can be downwardly opened at reaching height above the landing of stairs 8. The cover with filter cassettes 21 can therefore be reliably folded downward by the mechanic and filter cassettes 21 can be replaced or cleaned if necessary.

Lower filter box 72 is arranged in the direction of flow of lower air passage opening 6 also connected in front of and underneath the landing of stairs 8. Even the lower filter box 72 is equipped with a folding mechanism for lower filter cassettes 21 that allows filter cassettes 21 to be reliably folded downward by means of the cover and be replaced or cleaned.

The air entering through lower air passage opening 6 and cleaned by lower filter box 72 is drawn by a ventilator 15 through air conduit 10 into the inner space of tower 2 during which it passes electrical apparatuses 2, e.g., a transformer, and cools them. The air receiving the waste heat is drawn off by ventilator 15 arranged in this example above an intermediate bottom and through further air conduit 14 and blown out of air discharge opening 16 to the outside.

The air passing through upper air passage opening 7 and filtered by upper air filter box 71 flows through the further air conduit 74, transported by a ventilator 25, past electrical apparatus 9. The construction basically corresponds here to the construction shown in FIG. 3. However, there is no filter arranged there with filter boxes in the interior of tower 3 but rather a filter box 71 with filter 21 is connected outside of the tower in front of upper air passage opening 7.

Figure 7:
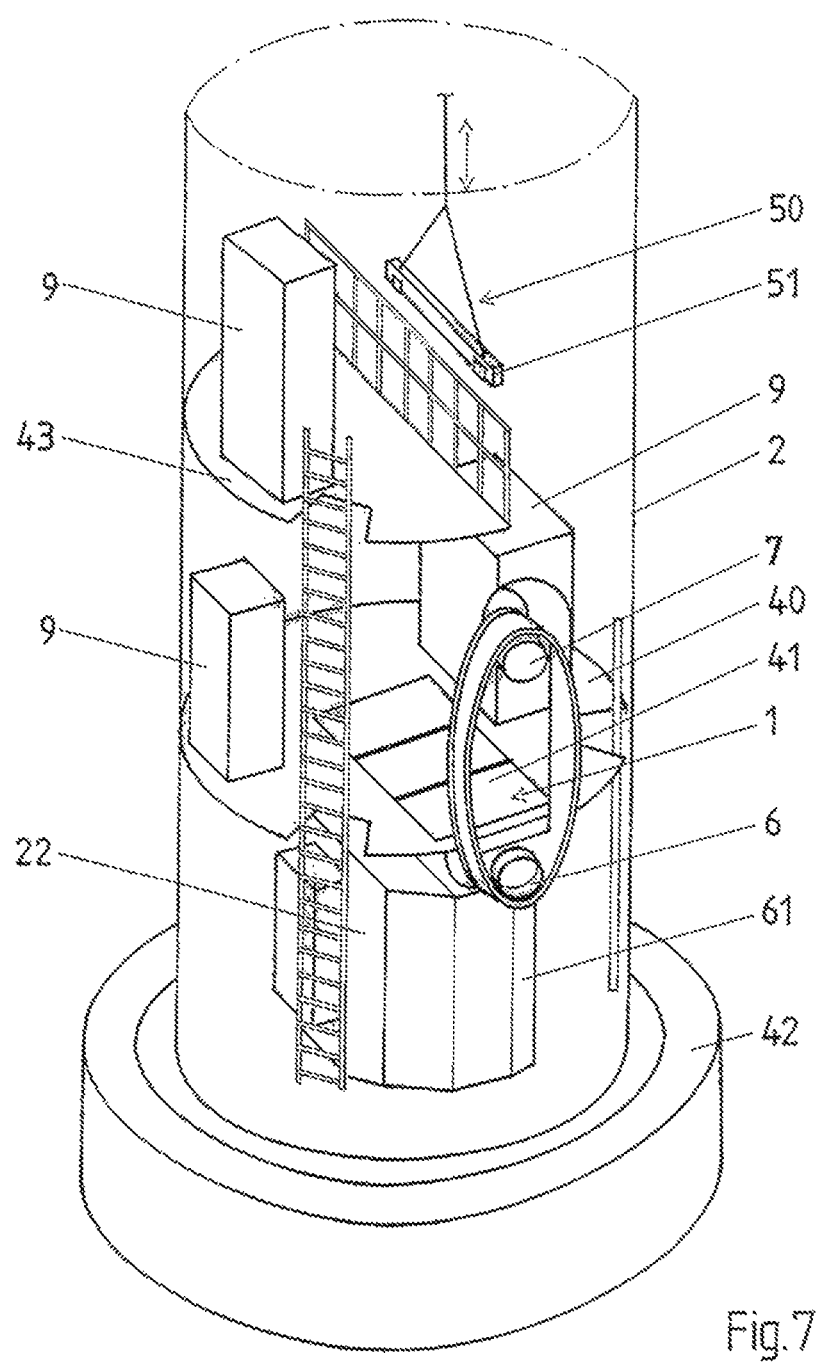
FIG. 7 shows a perspective view of a tower segment in accordance with the invention.

FIG. 7 shows tower 2 in a perspective phantom view with removed door frame 3 but with air passage openings 6, 7.

Transformer 22 and area 1 are designed and coordinated in their size with one another in such a manner that transformer 22 can be introduced through area 1, when door frame 3 is removed, into tower 2 and also removed later.

Transformer 22 can be designed smaller than usual as a result of the purposeful ventilation in accordance with the invention, such as shown, for example, in FIG. 5, namely, so small that it fits through area 1 after detachable door frame 3 has been removed. The purposeful ventilation is achieved by door frame 3 in accordance with the invention and its air passage openings 6, 7, possible air conduction and/or by the air-conduction transformer housing 61. Transformer housing 61 can be dismantled for the transport of transformer 22 and preferably be disassembled so that even these parts fit through area 1.

Transformer 22 can be raised or lowered through an intermediate bottom 40 according to FIG. 7. To this end a loading flap or landing plates 41 that can be taken up can be let into intermediate bottom 40 in order to be opened. The raising of transformer 22 takes place with a lifting appliance 50 that can preferably be suspended from a flange (not shown) of the lowest tower segment of tower 2 inside tower 2. Alternatively, fastening points for arresting lifting appliance 50 can also be provided in the tower wall.

Transformer 22 is preferably screwed or clipped to a horizontal loading beam 51 of lifting appliance 50 according to FIG. 8. Clips 52 can be equipped with running rollers 53 in the manner of a traveling crab in order to make possible a horizontal shifting of transformer 22 suspended on loading beam 51 along loading beam 51.

Running rollers 53 can run, for example, in a double T form of loading beam 51, as shown in FIG. 9. During the lifting or lowering of transformer 22 suspended on loading beam 51 clips 52 are secured against sliding by fixing bolts 54 on loading beam 51. Transformer 22 can be fastened on clips 52 for assembly by eyelets 55 arranged on clips 52.

Loading beam 51 can be extended outward, as schematically shown in FIG. 10, through door opening 1 to a loading bridge in order that transformer 22 can be shifted out of tower 2 or into tower 2. The outer end of the loading bridge can be supported outside of tower 2, for example, with a support on the bottom or can be held in a suspended manner at the correct height with the aid of a crane 58 (not shown). The loading bridge comprises the loading beam 51 provided inside tower 2 and comprises a loading beam 56 provided outside the tower. Loading beam 51 provided in tower 2 and loading beam 56 provided outside of tower 2 can be connected to one another in such a manner that they are temporarily fixed in their position by a connecting structural component 57 for shifting transformer 22 by means of clips 52 along the loading bridge and form the loading bridge by their fixed connection.

Transformer 22, its housing parts and also additional electrical apparatuses 9 in FIG. 7 can be raised or lowered through intermediate bottom 40 when landing slabs 41 are taken up. In particular, it is also possible to first set transformer 22 and electrical apparatuses 9 on a foundation plate 42 of tower 2 and subsequently lift electrical apparatuses 9, e.g., with the growing of tower 2 during its construction, through intermediate bottom 40 to the intermediate bottom level or to higher level. At least one intermediate bottom 40 in tower 2 can also be constructed in particular as a partial bottom 43 or gallery in order to allow a vertical path past this partial bottom 43 inside tower 2.

The invention claimed is:

1. A method for installing or transporting an electrical apparatus in and out of a tower of a wind power installation,
   wherein the electrical apparatus is provided in a foot of the tower,
   wherein the tower comprises a reversibly detachable door frame comprising a door opening to an interior of the tower,
   wherein the door frame has an outer contour that forms an area in a wall of the tower,
   wherein a size of the electrical apparatus is larger than the door opening but smaller than the outer contour of the door frame,
   wherein the door frame comprises at least one air intake opening for cooling of the electrical apparatus, wherein the at least one intake opening comprises a first ventilator that transports ambient air from an exterior of the tower to the interior of the tower,
   wherein the door frame or the wall of the tower comprises an air discharge opening, wherein the air discharge opening comprises a second ventilator that transports air from the interior of the tower to the ambient air at the exterior of the tower,
   which method comprises the steps of
   (i) detaching and removing the door frame from the area in the wall of the tower;
   (ii) attaching the electrical apparatus to a horizontal loading beam of a lifting appliance;
   (iii) shifting the electrical apparatus along the horizontal loading beam;
   (iv) transporting the electrical apparatus into or out of the interior of the tower through the area in the wall formed by the outer contour of the door frame; and
   (v) reattaching the door frame to the area in the wall of the tower.

2. The method of claim 1, wherein the door opening is closeable with a door leaf.

3. The method according to claim 1, wherein the door frame has a substantially oval outside contour and the door opening is substantially rectangular.

4. The method of claim 1, wherein the at least one air intake opening is arranged above the door opening or under the door opening or arranged both above and under the door opening, for an air flow cooling of the electrical apparatus.

5. The method of claim 1, wherein the at least one air intake opening is arranged below the door opening.

6. The method of claim 1, wherein the at least one air intake opening is positioned below the door opening.

7. The method of claim 1, wherein the at least one air intake opening is a first air intake positioned below the door opening, and a second air intake positioned above the door opening.

8. The method of claim 1, wherein the at least one air intake opening is an air intake positioned below the door opening, and an air outlet is positioned above the door opening.

* * * * *